UNITED STATES PATENT OFFICE.

SHIRLEY L. AMES, OF NEW YORK, N. Y.

CITRUS-JUICE POWDER.

1,373,933.     Specification of Letters Patent.     Patented Apr. 5, 1921.

No Drawing.     Application filed May 3, 1919. Serial No. 294,553.

*To all whom it may concern:*

Be it known that I, SHIRLEY L. AMES, a citizen of the United States, and a resident of the borough of Manhattan, city, county, and State of New York, have invented a certain new and useful Citrus-Juice Powder, set forth in the following specification.

This invention relates broadly to the citrus fruit industry and more particularly to the conservation of waste therein, although it primarily relates to the creation of a new article of manufacture.

Owing to the perishable nature of fruit of this class it has never proved feasible to ship to any considerable distance other than the perfect and sound fruit, this in a large measure because one imperfect fruit in a package will soon contaminate the whole. Thus a considerable percentage of an entire crop, say from five to twenty per cent., constitute what is known as the "culls", often allowed to rot on the ground for lack of a proper method for salvage. To a certain extent the oil of lemon and the oil of orange have been salvages from the peel of this fruit, but at such a manufacturing expense as to be practically prohibitive unless some utilization of the juice as well was contemporaneously made.

Many attempts, over a long period of years, have been made to preserve natural citrus juice, but without success. The citrus fruit industry and its difficulties are well epitomized in the article by R. T. Will, entitled "Some phases of the citrus by-product industry in California", published in January, 1916, in "*The Journal of Industrial and Engineering Chemistry*" by the American Chemical Society, commencing on page 78. Heretofore any so-called orange juice or lemon juice salvages from such citrus fruit has so little resembled the natural product as to be truly misnamed. The juice of such citrus fruit, when once squeezed from the fruit, remains natural for barely twenty minutes. It is understood that certain enzyms are present in the natural fruit juice, which, when the juice is exposed to the air, become active and bring about a very considerable chemical change in the juice,—so much of a change, in fact, as to change its entire natural character and make it unfit for human consumption. The various attempts to preserve this juice have all so altered the character of the resultant product as to make it no longer the natural fruit juice.

The particular object of my invention is to utilize the natural juice of citrus fruit, make a new article of manufacture out of it, which may readily be preserved practically indefinitely and which, when it is to be consumed, may be reconverted by the addition of water into substantially the original natural fruit juice. My new article of manufacture may be produced by at least two processes, to my knowledge. I recognize and respect the fact that the natural juice of citrus fruit contains normally inactive enzyms which are ready to become active upon exposure to the air in the presence of water. The fruit which should preferably but not of necessity be all of one kind, such as all oranges, or all lemons, or all grapefruit, or all mandarins, or all limes, etc., is first peeled and, as a by-product, the oil from the peel may be salvaged. The juice-containing pulp body is then squeezed or mashed in bulk by as rapid a process as possible. A continuously acting worm or screw process is preferable. This newly extracted juice is then strained through any suitable straining mechanism such as rotary silk strainers and is conveyed preferably continuously, although it may be intermittently, into a container or delivery tank such as the container 1 of the Patent No. 997,950, process of evaporating fluids, granted July 18, 1911, to F. P. Bergh, *et al.* This juice is then preferably continously atomized into the Bergh apparatus under such operating conditions that the juice will be completely dehydrated in a minimum of time. In fact, it is important in the practice of my process that the squeezing, straining and dehydrating operation take place well within twenty minutes. It is useless to attempt to produce my new dry, solid material which will be capable of reproducing the natural citrus juice if the juice is allowed first to continue for any length of time under the active operation of its contained enzyms.

The solids of the citrus juice, partly in solution and partly in suspension and emulsion, are dropped into the bottom of the Bergh apparatus and are immediately packed under as nearly as possible anhydrous atmospheric conditions in tins or any suitable containers, which may be sealed against the advent of moisture. I have found that this powdered material will keep indefinitely, and that by dissolving it in the proper amount of water substantially the original, natural fruit juice results.

I desire it to be understood that my claim for my new product does not prohibit the introduction of additional sugar in the natural juice before its dehydration so that I may have a resultant article of manufacture which itself contains the natural solids of the natural fruit juice in their original proportions and chemical conditions and, in addition, a sufficient amount of added sugar to make a pleasing sweetened beverage when later the powder is mixed with water. For example, the solids of lemon juice may have a sufficient amount of sugar added to produce lemonade ready for consumption merely by the addition of water.

As a modified process, I have found that the twenty minute limit for the completion of the manufacture may be somewhat extended by neutralizing the growth and propagation of the enzyms as soon as the juice has been squeezed from the fruit, either before or after straining. This I accomplish preferably by the addition of a small percentage of sulfurous acid which may be of such small amount as not to destroy the enzyms but to check their action for a sufficient time until the juice can be sufficiently dehydrated to prevent the formation of the characteristic bitter taste in citrus fruit juice that has been permitted to be subjected to their unchecked action. I prefer to use from 1½ to 3 ounces of sulfurous acid to each 100 gallons of juice or, for convenience, from 3 to 6 ounces of potassium metabisulfite, to 100 gallons of juice, which is a convenient way of obtaining the sulfurous acid. By the use of this chemical my process of manufacture may be slower, but in other respects is the same as has been described. It should be understood that the natural fruit juice does not have to be pasteurized at all. The key-note of the preferred process is the speed of the operation from the removal of the juice from nature's fruit cells to a condition of sufficient dehydration of the fruit solids contained in the natural fruit juice to insure their preservation in such state that they may later be dissolved in water to reproduce substantially the original natural juice.

What I claim and desire to secure by United States Letters Patent is:—

1. A new article of manufacture consisting of a self-preserving powder of dry solids comprising substantially in nature's proportions and chemical conditions all the solids of the natural juice of a citrus fruit as they exist immediately after extraction from the fruit.

2. A new article of manufacture consisting of a self-preserving powder of dry solids comprising substantially in nature's proportions and chemical conditions all the solids of the natural juice of a citrus fruit as they exist immediately after extraction from the fruit, said powder being capable of re-solution in water to reproduce substantially the original fruit juice.

3. The process of forming a dry, powdery solid from the natural juice of a citrus fruit which shall comprise substantially all the solid content of the natural juice in substantially nature's proportions and chemical conditions, comprising extracting the juice from the fruit; dehydrating the juice in atomized form before the contained enzyms have commenced considerable propagation; and maintaining the resultant powdery solid free from water to prevent the growth and propagation of the said enzyms.

In witness whereof I have signed my name to this specification, this 11th day of January, 1919.

SHIRLEY L. AMES.